United States Patent [19]

Morningstar et al.

[11] 4,024,330

[45] May 17, 1977

[54] INTERNALLY COATED REACTION VESSEL AND PROCESS FOR COATING THE SAME

[75] Inventors: Marion G. Morningstar, Avon Lake; Henry J. Kehe, Akron, both of Ohio

[73] Assignee: The B. F. Goodrich Company, Akron, Ohio

[22] Filed: Aug. 26, 1975

[21] Appl. No.: 607,262

Related U.S. Application Data

[63] Continuation-in-part of Ser. No. 566,086, April 8, 1975, abandoned, which is a continuation-in-part of Ser. No. 507,129, Sept. 18, 1974, abandoned.

[52] U.S. Cl. .............................. 526/62; 427/230; 23/252 R
[51] Int. Cl.² .................................. C08F 10/00
[58] Field of Search ........ 260/2 R, 47 R; 427/230, 427/236, 238, 239, 388 R; 428/35, 262, 423, 458, 474; 23/252 A, 285; 526/62

[56] References Cited

UNITED STATES PATENTS

| | | | |
|---|---|---|---|
| 2,163,639 | 6/1939 | Von Bramer et al. | 260/47 R |
| 3,440,197 | 4/1969 | Boldebuck | 260/29.2 N |
| 3,515,709 | 6/1970 | Nelson et al. | 260/92.8 W |
| 3,678,006 | 7/1972 | Bilow | 260/47 R |
| 3,678,008 | 7/1972 | Huck et al. | 260/47 R |
| 3,738,974 | 6/1973 | Takehisa et al. | 23/285 |
| 3,778,423 | 12/1973 | Reiter | 260/92.8 W |
| 3,799,795 | 3/1974 | Crawford | 428/458 |
| 3,849,179 | 11/1974 | Morningstar | 427/230 |

*Primary Examiner*—Ronald H. Smith
*Assistant Examiner*—S. Silverberg
*Attorney, Agent, or Firm*—Roy P. Wymbs

[57] ABSTRACT

A reaction vessel having on the internal surfaces thereof a coating containing, as a primary ingredient, a straight chain or branched polyaromatic amine made by the reaction of any one by itself, except the polyhydric phenols, or more than one, of the compounds selected from polyamino benzenes, polyhydric phenols, aminophenols, alkyl-substituted aminophenols, diphenylamines, and alkyl-substituted diphenylamines, which coating is applied to said surfaces from an organic solvent solution. Also included are the above compounds having a halogen substitution on the ring. Further, there is included the process for coating said internal surfaces whereby polymer build-up on said surfaces is substantially eliminated.

49 Claims, No Drawings

4,024,330

INTERNALLY COATED REACTION VESSEL AND PROCESS FOR COATING THE SAME

CROSS REFERENCE TO RELATED APPLICATION

This application is a continuation-in-part of our copending application Ser. No. 566,086, filed Apr. 8, 1975 now abandoned, which in turn is a continuation-in-part of our copending application Ser. No. 507,129, filed Sept. 18, 1974, now abandoned.

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposit, or "build-up", of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer build-up must be removed since it results in further formation of polymer build-up on the reactor surfaces which results in a crust that adversely affects heat transfer and contaminates the polymer being produced.

The nature of the polymer build-up or insoluble deposit on the walls of the reactor is such that in the commercial production of polymers, as described above, it has in the past been standard practice, after each polymerization reaction is completed, to have an operator enter the reactor and scrape the polymer build-up off the walls and off the baffles and agitator. An operation such as this is not only costly, both in labor and down-time of the reactor, but presents potential health hazards as well. While various methods have heretofore been proposed to reduce the amount and nature of polymer build-up on polymerization reactor surfaces, such as solvent cleaning, various hydraulic and mechanical reactor cleaners, and the like, none has proved to be the ultimate in polymer build-up removal. That is to say, these various methods and apparatus have done an acceptable job, but there is still room for improvement in this area, particularly from an economic point of view.

Further, it has recently been determined that vinyl chloride in the atmosphere is injurious to the health of humans and, as a result, the U.S.A. Government has issued certain regulations that require PVC (polyvinyl chloride) producers to maintain a very low concentration of vinyl chloride in the atmosphere of their plants. It is heretofore desirable to be able to operate a PVC plant without having to open the reaction vessels or polymerizers after each charge or batch is polymerized for the purpose of cleaning the reactor. Being able to operate a closed polymerization system would prevent the escape into the atmosphere of residual vinyl chloride present in the reactor after each batch is made. Also, elimination of polymer build-up also eliminates the presence of residual vinyl chloride in said build-up. Accordingly, a process or means of producing PVC, and like polymers, which not only eliminates polymer build-up, but also reduces and/or eliminates pollution of the atmosphere would be most desirable, and indeed essential.

SUMMARY OF THE INVENTION

It has been found that if a reaction vessel has been previously coated on the interior surfaces with the proper coating, undesirable polymer build-up on said surfaces can be substantially decreased, and in some cases, entirely eliminated. We have unexpectedly found that when the interior surfaces of a reactor or polymerizing vessel, whether metal or glass-lined, are covered with a film or coating containing, as a primary ingredient, a straight chain or branched polyaromatic amine made by the reaction of any one by itself, except the polyhydric phenols or with any one or more, of the compounds selected from polyamino benzenes, polyhydric phenols, aminophenols, alkyl-substituted aminophenols, diphenylamines, and alkyl-substituted diphenylamines, including halogen substitution on any of said compounds, polymer build-up on said surfaces is essentially eliminated and multiple charges or batches of polymer can be made in said reaction vessel without opening the same. The polyaromatic film or coating is very easily applied to the interior surfaces of the reaction vessel from an organic solvent solution thereof.

DETAILED DESCRIPTION

In accordance with the present invention, a film or coating of a polyaromatic amine is applied to the interior surfaces of the reactor by means of an organic solvent solution thereof, in which reactor polymerization reactions are carried out. Likewise, all exposed surfaces on the interior of the reactor, such as the baffles, agitator, and the like, are also coated in like manner. The coating thus applied is readily insolubilized by the use of heat to evaporate the organic solvent thereby leaving on said surfaces a tightly adhering, varnish-like coating that will last through multiple polymerization cycles before it needs to be reapplied. The exact mechanism by which the polyaromatic amine coating functions to prevent build-up of polymeric scale on the inner surfaces of the reaction vessel is not certain but it is believed to be a free radical destroying mechanism or free radical trapping mechanism. This is so because aromatic diamines are known to destroy free radicals, for example, as in their well-known activity as antioxidants. Thus, with the destruction of the free radicals by the polyaromatic amine coating, polymerization on the coated surfaces is inhibited.

The straight chain or branched polyaromatic amines, useful in the coatings of the instant invention, are made by reacting any one of the compounds listed below with itself, with the exception of the polyhydric phenols, by means of a condensation reaction or reacting or condensing two or more of said compounds together. Generally, such reactions are carried out with heat in the presence of an acidic catalyst. The polyaromatic amines thus formed have the following general structures:

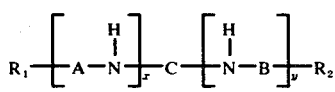
I.

wherein A, B and C are either

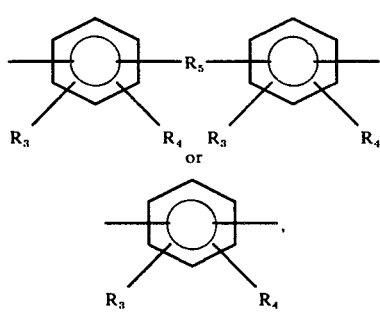

wherein $R_3$ and $R_4$ are the same as defined below, and $R_5$ is

or a straight chain or branched alkylene or alkylidene group containing from 1 to 5 carbon atoms, and wherein A, B, and C may be the same or different and each repeating unit may be the same or different; $R_1$ and $R_2$ are either —H, —OH, —NH$_2$ or

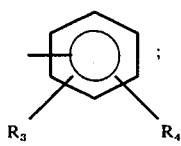

$R_3$ and $R_4$ are either —H, halogen, —OH, —NH$_2$, or an alkyl group containing from 1 to 8 carbon atoms and may be the same or different; $x$ is an integer from 1 to 20; and $y$ is an integer from 0 to 20. When a trifunctional compound is employed, such as the trihydroxy benzenes, for example, then branched chains will result thus producing a branched polyaromatic amine.

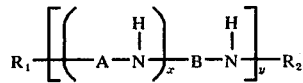
II.

wherein A and B are either

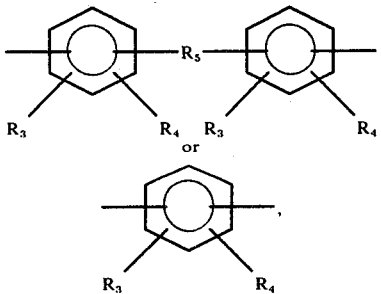

wherein $R_3$, $R_4$ and $R_5$ are the same as in formula (A), and wherein A and B may be the same or different and each repeating unit may be the same or different; $R_1$ is —H, —OH, —NH$_2$ or

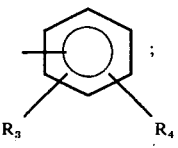

$R_2$ is —H, —OH, or

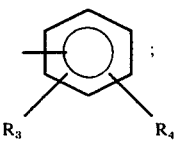

$x$ is an integer from 1 to 4; and $y$ is an integer from 1 to 15.

The compounds generally useful in making the polyaromatic amines employed in the present invention are (a) the polyamino benzenes having the formula:

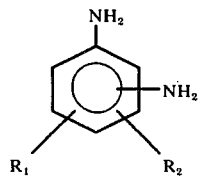

wherein $R_1$ and $R_2$ are either —H, halogen, —NH$_2$, —OH or an alkyl group containing from 1 to 8 carbon atoms, and may be the same or different, such as, for example, ortho, meta and paraphenylene diamines; diamino toluenes, diamino xylenes, diamino phenols, triamino benzenes, toluenes and xylenes; ethyl, propyl, butyl and pentyl di- and tri-amino benzenes; and the like; the most preferred compounds being those in which $R_1$ is —H and $R_2$ is —H, methyl, or ethyl; (b) the polyhydric phenols having the formula

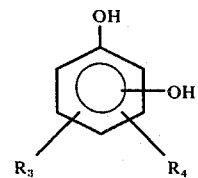

wherein $R_3$ and $R_4$ are either —H, halogen, —$NH_2$, —OH, or an alky group containing from 1 to 8 carbon atoms, and may be the same or different, such as, for example catechol, resorcinol, chloro-resorcinol, hydroquinone, phloroglucinol, pyrogallol, etc.; dihydroxy toluenes and xylenes; trihydroxy toluenes and xylenes; ethyl, propyl, butyl and pentyl di- and trihydroxy benzenes; and the like, the most preferred compounds being those in which $R_3$ is —H and $R_4$ is —H or —OH; (c) the aminophenols and alkyl-substituted aminophenols having the formula

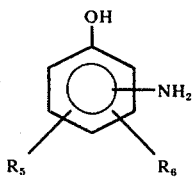

wherein $R_5$ and $R_6$ are either —H, halogen, —$NH_2$, —OH or an alkyl group containing from 1 to 8 carbon atoms, and may be the same or different, such as, for example, ortho, meta, and para-aminophenols; diamino- and triamino- phenols; methyl, ethyl, propyl, butyl and pentyl amino and diaminophenols; and the like, the most preferred compounds being those in which $R_5$ is —H and $R_6$ is —H or —$NH_2$; and (d) diphenylamines, alkyl-substituted diphenylamines and other compounds having the formula

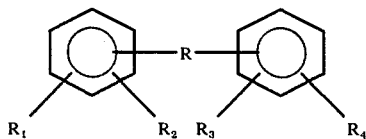

wherein R is

or a straight chain or branched alkyl group containing from 1 to 5 carbon atoms, and $R_1$, $R_2$, $R_3$ and $R_4$ may each be —H, —$NH_2$, —OH, halogen or an alkyl group containing from 1 to 8 carbon atoms and at last two are —$NH_2$, —OH or one of each, such as, for example, bis-phenol A, and the like, the most preferred compounds being those in which $R_1$ and $R_4$ are —OH or —$NH_2$ and $R_2$ and $R_3$ are —H.

The halogen in the above formulas may be chlorine, bromine, iodine, or fluorine. The presence of the halogen atoms does not affect the solubility of the polyaromatic amines in organic solvents.

When reacting two or more of the above compounds together, by means of a condensation reaction, at least one of the compounds must contain an amino group and in the case of more than two compounds involved in the reaction, it is preferable that at least two of said compounds contain an amino group. For example, useful polyaromatic amines are those formed by condensing together m-phenylenediamine, resorcinol and p-aminophenol, as well as by condensing together m-phenylenediamine, resorcinol, phloroglucinol and m-aminophenol, etc.

The molecular weight, or degree of condensation, of the polyaromatic amine depends upon the ratio in which the reactants, if more than one compound is employed, are combined, the time and temperature of heating, and the kind and concentration of the catalyst. When self-condensing any of the above-named compounds, the time and temperature of heating, and the kind and concentration of the catalyst will likewise be important in regulating the final molecular weight. Further, the molecular weight can be regulated by using small amounts of mono-functional compounds. For example, one can use small amounts of an aromatic monoamine or a phenol to cap the polymerization and thereby control the molecular weight. Polyaromatic amines having a molecular weight greater than about 250 are satisfactory for use in the present invention. The upper limit of molecular weight will vary depending upon the particular compound or compounds used in making the polyaromatic amine. Suffice it to say that the particular compound must have a molecular weight such that it is workable and soluble in an organic solvent so that it can be easily applied to the inner surfaces of the reactor. We have found that polyaromatic amines having a molecular weight in the range of about 250 to about 2000 are preferred.

While all of the previously described polyaromatic amines are useful in the practice of the present invention, particularly useful polyaromatic amines are those obtained when an aromatic diamine and a polyhydric phenol are reacted together. Usually these compounds are reacted together in approximately equal molar ratio. However, one can use an excess of either the diamine or the phenol. The only difference is that when an excess of the polyhydric phenol is employed, polyaromatic amines are obtained which have a somewhat higher softening point than those made in the presence of an excess of the aromatic diamine. While some of the polyaromatic amines useful in the present invention do not have a definite softening point, it has been found that among the solid polyaromatic amines those having a softening point in the range of about 65° C. to about 175° C. are most satisfactory.

The softening point of the polyaromatic amine, as used herein, is determined as follows: the polyaromatic amine is melted and cast into a split aluminum mold to make a cube which is ½ inch on a side. The mold is cooled, the cube removed therefrom and allowed to cool thoroughly. The cube is then attached to a thermometer bulb by heating the bulb to a temperature in excess of the expected softening point and laying it on the side of the cube, then cooling to 35° C. The thermometer with the cube attached is inserted into a mercury bath which has been preheated to 35° C. The insertion is made so that the top face or side of the cube is one inch below the mercury surface. The mercury bath is then heated at a rate of 4° C. per minute. The softening point is determined as the temperature at which, as the cube moves upward, the cube just breaks the surface of the mercury. It is to be noted that the cube should crawl up on the thermometer and not "pop-up". This is accomplished by carefully controlling the rate of rise in temperature of the mercury bath.

Again it is reiterated that many polyaromatic amines useful in the practice of the present invention do not have definite softening points but are viscous, flowable materials which are normally solid at room temperature. However, when these polyaromatic amines are dissolved in an organic solvent and deposited on the reactor surfaces, they leave a monomer- and water-insoluble film or coating thereon upon removal of the solvent therefrom, thus accomplishing the objectives of the invention.

It has heretofore been pointed out that when any of the above-identified compounds are self-condensed, except the polyhydric phenols or reacted with one or more other compounds, an acid catalyst is employed. We have found HCl to be the most effective catalyst. However, other useful catalysts may likewise be employed, such as, for example, methane sulfonic acid, benzene sulfonic acid, sulfanilic acid, phosphoric acid, iodine, benzene disulfonic acid, hydrogen bromide (HBr), hydrogen iodide (HI), aluminum chloride, and the like. The concentration of catalyst will vary depending upon the particular one used. It has been found, however, that a catalyst concentration of from about 0.005 mole to about 0.20 mole per mole of the compound being self-condensed, or per mole of the amino compound when one or more compounds are being reacted, is satisfactory. At any rate, the amount of catalyst employed is not critical.

The temperature of the reaction of the compounds, either alone or with others, will vary depending upon the time of the reaction and the molecular weight desired in the final product. For example, one can heat the reaction ingredients to 315° C. rapidly and then hold at that temperature for various periods of time. Also, the reaction ingredients can be heated to various temperatures above 300° C. and immediately cooled. When this latter procedure is employed, we define the time of reaction as 0 hours. Accordingly, the temperature of the reaction will vary from about 250° C. to about 360° C. and the time of reaction will vary from about 0 hour to about 3 hours. The preferred range of reaction temperature is from 275° C. to 330° C. and the time of reaction from 0 hur to 1 hour. It is understood, of course, that the particular time and temperature selected is dependent upon the catalyst employed and the final molecular weight of the polyaromatic amine desired.

The polyaromatic amine coating solution is made by conventional methods, using heat and agitation where necessary. The polyaromatic amine is dissolved in an appropriate organic solvent, or in a combination solvent, such as, for example, two or more organic solvents or an organic solvent mixed with an inorganic material, such as water, to give a solution that has a viscosity such that it can be sprayed or brushed on the reactor surfaces, such as in the case of paint or varnish. Usually a coating solution having a solids content in the range of about 0.10% to about 10.0% by weight is satisfactory. However, the solids content depends upon the molecular weight of the polyaromatic amine. That is, the solids content could, in certain instances, be greater than 10.0% or less than 0.10% by weight. In addition, additives may be employed in the coating, if desired, such as plasticizers, dyes, stabilizers, lubricants, fillers, or pigments, and the like. Of course, when additives are employed, suitable adjustment in the solids content of the coating solution is made. Many known organic solvents may be employed in making the coatings of the instant invention depending upon the polyaromatic amine used. As examples of such solvents, there may be named methyl alcohol, ethyl alcohol, Cellosolve (monoethyl ether of ethylene glycol), tetrahydrofuran containing 10% water, dimethylformamide, dimethylsulfoxide, methyl amine, ethyl amine, butylamine, dibutylamine, cyclohexylamine, diethylenetriamine, acetone, ethylene glycol, and the like.

After application of the coating to the surfaces to be protected, the coating, or the polyaromatic amine is dried or cured by vaporizing the solvent. With very volatile solvents, such as methanol, it is merely sufficient to blow air through the reaction vessel to remove the solvent or vapors. With higher boiling solvents, such as dimethylformamide, it may be necessary to heat the reaction vessel wall while blowing air through the vessel, or evacuating the vessel, in order to remove the solvent from the coating. Also, heating of the coating can be accomplished by the use of heaters positioned internally of the reactor, or by radiant heating.

Since the coating, or polyaromatic amine, must be insoluble in the reaction mixture, it must be insoluble in both water and vinyl chloride, and/or other monomer or monomers present in the reaction mixture. The polyaromatic amines of the present invention are insoluble in water and have a very low order, if not nil, of solubility in vinyl chloride, and other monomers useful in forming polymers and copolymers, the solubility decreasing as the molecular weight, or softening point, increases. It is also necessary that the coating should remain substantially chemically and physically unaffected in the presence of the components of the reaction, that is, it should be substantially inert under the reaction conditions.

As previously pointed out, the coating may be applied to the interior surfaces of the reaction vessel in any convenient manner, such as by spraying, brushing on, dipping, flooding, and the like. Brushing has been found to be efficient since it insures complete coverage of all surfaces. Any uncovered areas, such as pinholes, etc., should be avoided inasmuch as such exposed areas provide sites for polymer build-up. If desired, more than one application or layer of the coating may be used. In many instances, depending upon the condition of the surface being coated, plural layers are desirable since complete coverage is thereby insured. In this regard, it should be noted that for best results the surface being coated should be as clean and smooth as possible. In the case of metal surfaces, cleaning by acid etching or abrading is satisfactory.

The amount of coating applied, or the thickness thereof, is not particularly critical. However, for economic reasons, as thin a coating as possible should be applied to the surfaces to be protected but still insuring complete coverage. Again, it should be borne in mind that in addition to coating the interior surfaces or walls of the reaction vessel, all other parts therein should likewise be coated, such as baffles, agitator shaft and blades, heating coils, temperature probes, and the like. Suffice it to say that a sufficient amount of coating should be employed to obtain a continuous film over all interior surfaces of the reaction vessel with no areas of said surfaces remaining unprotected.

After application and curing or drying of the coating on the interior surfaces of the reaction vessel, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein. Ordinary care should, of course, be exercised to avoid rough, physical contact with the coated surfaces because of the damage to the film which may result from such contacts.

While the present invention is specifically illustrated hereinafter with regard to the suspension polymerization of vinyl chloride, it is to be understood that the apparatus and process may likewise be applied in the dispersion, emulsion, or suspension polymerization of any polymerizable ethylenically unsaturated monomer or monomers where undesirable polymer build-up occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers having at least one terminal $CH_2=C<$ grouping, copolymerizable therewith in amounts as great as about 80% or more by weight, based on the weight of the monomer mixture, since polymer build-up in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will normally vary from about 2 to 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

In order to more clearly define the present invention, the following specific examples are given. It is to be understood, however, that this is merely intended in an illustrative and not in a limitative sense. In the examples, all parts and percents are by weight unless otherwise indicated.

EXAMPLE I

In this Example m-phenylenediamine (m-PDA) was reacted with resorcinol (R) in a molar ratio of m-PDA/R of 1.2 in a glass reaction vessel in the presence of 0.10 mol of HCl per mole of m-PDA as catalyst. The temperature of the reaction mixture was raised to 305° C. and then immediately cooled. This amounted to 0.0 hour at maximum temperature. The resultant polyaromatic amine had a softening point of 92° C. The polyaromatic amine was then dissolved in Cellosolve to give a 0.5% by weight coating solution. The inner surfaces of a polymerization reactor were coated by brushing the solution thereon with an absorbent pad and drying by means of heat.

To the internally coated reaction vessel there was added the following recipe:

| | |
|---|---|
| Vinyl chloride | 100 parts |
| Water (demineralized) | 180 parts |
| Methocel* | 0.06 part |
| 2,2'-azobis-(2,4-dimethyl-valeronitrile) | 0.075 part |

*Hydroxypropyl methyl cellulose — Dow Chemical Company

The reaction was carried out in the usual manner under a blanket of nitrogen and pressure with agitation. The temperature of the polymerization was 56° C. and the reaction was continued until a substantial pressure drop occurred (approximately 4.5 hours) indicating that the reaction was complete. Thereafter, the contents of the reactor were removed in usual fashion. A second run in said reactor was made as above and the contents removed and the internal coated surfaces of the reactor were closely examined. The coating was intact and essentially unchanged. The surfaces were classified as clean, that is, with no polyvinyl chloride particles thereon.

When the same recipe, as given above, was polymerized under the same conditions in a rector which had not been coated internally, a heavy film of polymer being very rough in spots built up on the walls. Thus, the coating of the instant invention alleviates this difficulty.

EXAMPLE II

In this Example the procedure of Example I was followed in making the polyaromatic amine for the coating except that the molar ratio of m-PDA to R was 1.0 and the amount of HCl catalyst was 0.10 per mole of m-PDA. The temperature of the reaction mixture was raised to 315° C. and held there for 1 hour. The resultant polyaromatic amine had a softening point of 96° C. The polyaromatic amine was then dissolved in Cellosolve to give a 1.0% by weight coating solution. The inner surfaces of the polymerization reactor were coated as in Example I and the same polymerization recipe was employed. The same reaction conditions were used and four charges or runs were made prior to examining the inner walls. The coating was essentially unchanged and the surfaces were classified as clean with very few polyvinyl chloride particles thereon.

EXAMPLE III

The polyaromatic amine, prepared as in Example II, was employed in this Example. The polyaromatic amine was dissolved in dimethyl formamide to give a 2.0% by weight coating solution. One half of the inner walls of the polymerization reactor was painted with the coating solution and dried by means of heat. The rest of the inner wall was left uncoated as a control. In the polymerization of vinyl chloride, the same recipe, as used in Example I, was employed. The same reaction conditions were used and five charges or runs were made. After each run the inner wall was examined with the following results:

| PVC Run No. | Polyaromatic amine Coated Wall | Uncoated Wall (Control) |
|---|---|---|
| 1 | Clean | Film |
| 2 | Clean | Heavier film |
| 3 | Clean | Thin even coating of polymer |
| 4 | A few scattered sand spots | Heavy, even coating of polymer |
| 5 | Scattered sand spots | Very heavy coating of polymer, horny in places |

It can be seen that the coating of the present invention greatly improves the polymer build-up situation.

EXAMPLE IV

In this Example a quantitative determination of build-up was made. The polymerization conditions of Example I were employed except that the polymerization recipe was as follows:

| | |
|---|---|
| Vinyl chloride | 100 parts |
| Water (demineralized) | 182 parts |
| Polyvinyl alcohol | 0.10 part |
| 2,2′-azobis-(2,4-dimethyl-valeronitrile) | 0.075 part |

Two stainless steel plaques measuring 1½ inches by 2½ inches by ¼ inch were immersed in the reactor during the polymerization. One plaque was coated with the coating described in Example III, namely, a 2% solution of the polyaromatic amine in dimethylformamide. The other plaque was untreated and served as a control. Both plaques were weighed before immersion in the reaction mixture and weighed again when removed from the reactor upon completion of the polymerization reaction. The results were as follows:

| | |
|---|---|
| Control (uncoated) | 0.09 gram weight gain |
| Polyaromatic amine (coated) | 0.01 gram weight gain |

This shows the large difference in polymer build-up between coated and uncoated surfaces in polymerization reactors.

EXAMPLE V

In this Example, the self-condensation product of m-phenylenediamine (m-PDA) was employed. This product was made by charging 109 grams of m-phenylenediamine to a flask equipped with a reflux condenser and heating to a temperature of 200° C. Then 0.5 gram of AlCl$_3$ catalyst was added and the temperature raised to 250° C. The reaction was continued for 11 hours and the NH$_3$ coming off was collected in a water trap. Thereafter the reaction mixture was vacuum distilled in order to remove any unreacted diamine therefrom. The recovered condensed m-phenylenediamine was then dissolved in dimethylformamide to give a 2.0% by weight coating solution. The inner surfaces of a polymerization reactor were coated by brushing the solution thereon with an absorbent pad and drying by means of heat and circulating air.

To the coated reaction vessel was added the recipe of Example I with the exception that 0.05 part of catalyst (2,2′-azobis-(2,4-dimethylvaleronitrile) was used. The polymerization reaction was then carried out as described in Example I. After completion of the reaction, the polymer was removed therefrom in usual fashion, the internal surfaces were washed with water and a second run made. The same procedure was followed and a third run made. At the end of the third run it was noted that the coating was intact and essentially unchanged. The same number of runs were made in an uncoated reactor as a control. The condition of the internal coated surfaces were examined after each run with the following results:

TABLE I

| | Uncoated | Coated |
|---|---|---|
| After 1st charge: | Light paper build-up on part of surfaces | Clean — only one spot of paper build-up |
| After 2nd charge: | Same | Same |
| After 3rd charge: | Completely coated with paper build-up | Band of paper build-up on ½ of surface area |

From these results, the superiority of the coated surfaces over the uncoated surfaces is readily apparent.

EXAMPLE VI

In this Example, the self-condensation product of p-aminophenol (p-AP) was employed. The product was made by charging to a three neck flask 109 grams of p-AP and 8.3 cc's of concentrated HCl, said flask being equipped with a condenser. The flask was then heated and when the temperature reached 169° C., 180 cc's of xylene were slowly added to the reaction mixture. The purpose of the xylene was to remove the water formed during the condensation reaction as an azeotrope. The heating was continued for a period of three hours to a maximum of 222° C. Thereafter the mixture was cooled and washed with dilute HCl and the aqueous phase decanted off. The remainder was then vacuum stripped to remove any unreacted material. Upon cooling, the product became a solid which was then broken up into a fine granular condition, given a water wash, filtered and dried. The final product (condensed p-aminophenol) was dissolved in dimethylformamide to give a 1.0% by weight coating solution. This solution was then used in coating the inner surfaces of a polymerization reactor, as in Example V.

Using the recipe of Example I, a polymer was made in the coated vessel in two successive charges using a water rinse between charges, as in Example V. Two runs were also made in an uncoated reactor as a control. The condition of the internal coated surfaces were examined after each run with the following results:

TABLE II

| | Uncoated | Coated |
|---|---|---|
| After 1st charge: | Light paper build-up | Absolutely clean |
| After 2nd charge: | Heavier paper build-up | Clean except for a few spots of sandy build-up |

Again, the superiority of the coated surfaces is readily apparent.

EXAMPLE VII

In this Example, a number of polyaromatic amines were made using the procedure heretofore described in Example I. It will be noted that some of the polyaromatic amines are self-condensed products while the others are reaction products of two of the compounds described herein. The polyaromatic amines were made by condensing the compounds with the use of heat and HCl as a catalyst. The polyaromatic amines were dissolved in various organic solvents, as indicated in the Table below, and applied to the interior surfaces of a polymerization reactor, as in Example V. The recipe of Example VI was polymerized in the reactor in each case as well as in an uncoated reactor for the purpose of a control. Two charges were polymerized in each case without cleaning the reactor between charges. The condition of the internal coated surfaces were examined after each charge or run with the following results:

-continued

| | |
|---|---|
| dicarbonate | 5.45 gms. |

Stainless steel plaques measuring 1½ inches by 2½ inches by ¼ inch were coated with a 1% solution of the various amines in an organic solvent, as indicated in the Table IV below. In each case an uncoated plaque was used as a control. The plaques were weighed prior to immersion in the polymerization medium and the polymerization reaction was conducted at 56° C. under pressure. The polymerization was continued until the pressure decreased by 10 psig. The plaques were then removed, washed and dried, and then weighed to deter-

TABLE III

| Run No. | Polyaromatic amine | Solvent | % Solids by Wt. | After 1 Charge | After 2 Charges |
|---|---|---|---|---|---|
| 1 | Uncoated reactor | — | — | Medium sand ½ area - Light sand ½ area | Medium heavy sand all over |
| 2 | m-phenylenediamine/resorcinol | MeOH | 1 | Perfectly clean | Few spots — rest clean |
| 3 | m-PDA/p-aminophenol | MeOH | 1 | Perfectly clean | Perfectly clean |
| 4 | o-PDA/Catechol | MeOH | 1 | Perfectly clean | Perfectly clean |
| 5 | p-PDA/Cathechol | MeOH | 1 | Perfectly clean | Perfectly clean |
| 6 | p-PDA/Hydroquinone | MeOH | 1 | Perfectly clean | Perfectly clean |
| 7 | o-PDA/Hydroquinone | MeOH | 1 | Perfectly clean | Scattered spots ⅓ area |
| 8 | m-PDA/Bisphenol A | MeOH | 1 | Perfectly clean | Perfectly clean |
| 9 | m-PDA/Phloroglucinol | MeOH | 1 | Covered with light sandy BU (slightly better than control) | Better than control |
| 10 | m-PDA/Pyrogallol | DMF | 1 | Perfectly clean | Clean except for 1" streak at top |
| 11 | m-PDA/Catechol | DMF | 1 | Perfectly clean | Perfectly clean |
| 12 | o-PDA/Resorcinol | MeOH | 1 | Perfectly clean | Perfectly clean |
| 13 | p-PDA/Resorcinol | MeOH | 1 | Perfectly clean | Perfectly clean |
| 14 | Toluene-2,4-diamine/Resorcinol | MeOH | 1 | Perfectly clean | Clean except for streak at top |
| 15 | Self-condensed m-PDA | MeOH | 1 | Perfectly clean | Mostly clean — Light scattered sand |
| 16 | Toluene-2,4-diamine/Resorcinol | MeOH | 1 | Perfectly clean | Completely clean except few small spots |
| 17 | m-PDA/Phloroglucinol | DMF | 1 | Sandy streaks at top and middle | Streaky sand over ½ area |
| 18 | m-PDA/Resorcinol/p-aminophenol | MeOH | 1 | Perfectly clean | Perfectly clean |

PDA - phenylenediamine
BU - Build-up
MeOH - methyl alcohol
DMF - dimethylformamide The new and unexpected results of the various coatings is apparent from the above results.

mine the gain in weight due to polymer build-up. The data is set forth in the following Table:

TABLE IV

| Amine | Solvent | Weight Gain | Condition of Plaque |
|---|---|---|---|
| Uncoated | | 0.20 gm. | Heavy even paper + sandy build-up |
| Diphenylamine | Methyl alcohol | 0.10 gm. | One side nearly clear of paper Other side — light paper + light sand |
| Uncoated | | 0.06 gm. | Light paper + light sand all over |
| Triethylamine | Methyl alcohol | 0.09 gm. | Light paper + light sand all over |
| Uncoated | | 0.08 gm. | Light paper + light sand all over |
| Triphenylamine | Acetone | 0.09 gm. | Light paper + light sand all over |

EXAMPLE VIII

The purpose of this Example was to show that certain low molecular weight amines or monomeric compounds are not effective in preventing polymer build-up on the interior surfaces of a polymerization reaction vessel. As in Example IV, a quantitative determination of build-up was made. The following polymerization recipe was used in each experiment:

| | |
|---|---|
| Vinyl chloride | 40 lb. |
| Water (demineralized) | 72.8 lb. |
| Methyl cellulose | 545 gms. of 2% H₂O Soln. |
| Di-sec-butyl peroxy- | |

It can readily be seen from the above results that some amines do not prevent build-up. While diphenylamine had some effect, it shows that low molecular weight materials do not do the job.

EXAMPLE IX

In this Example, the condensation product of m-phenylenediamine (m-PDA) and 4-chlororesorcinol was employed. The product was made by charging to a three neck flask, equipped with a reflux condenser and a stirrer, 16.2 grams of m-phenylenediamine and 21.7 grams of 4-chlororesorcinol. This was an equimolar ratio of the ingredients. Then 1.3 ml. of HCl catalyst was added and the contents heated to 275° C. with stirring and held at this temperature for ½ hour. The product was then removed and dissolved in methyl alcohol to give a 1% by weight coating solution. The inner surfaces of a polymerization reactor were coated with said solution by brushing it on with an absorbent pad and drying by means of heat and circulating air.

To the coated reaction vessel, the following recipe was added:

| Vinyl chloride | 80 lbs. |
|---|---|
| Water (demineralized) | 144 lbs. |
| Methyl cellulose | 0.048 lb. |
| Di-secondary butyl peroxydicarbonate | 0.024 lb. |

The reaction was carried out in the usual manner under a blanket of nitrogen with pressure and agitation. The temperature was maintained at 56° C. and the reaction was continued until a substantial pressure drop occurred indicating that the reaction was complete. After the contents of the reactor were removed in usual fashion, the internal surfaces were examined and found to be absolutely clean of polymer build-up. A second run in said reactor was made as above, the contents removed and the surfaces examined. Again the surfaces were absolutely clean of polymer build-up.

When the same recipe, as given above, was polymerized under the same conditions in an uncoated reactor, after the first charge there was a light haze on the internal surfaces, and after the second charge said surfaces were covered with a light paper build-up. It can be seen that the coating eliminates the problem of build-up.

Coating of the internal surfaces of a polymerization vessel or reactor in accordance with the present invention substantially reduces polymer build-up and thus results in increased production over a unit period of time. In those instances where a little polymer does accumulate on the interior surfaces, it is not of the hard, rough, difficult-to-remove type and is easily removed by rinsing said surfaces with water, such as by hosing them down, without employing the difficult tedious scraping methods that are presently necessary in the art.

Most important, the present invention enables one to produce multiple batches of polymers in a reactor without having to open the same between charges. In the case of polymerizing or copolymerizing vinyl chloride, this greatly reduces the parts per million of vinyl chloride in the atmosphere in the plant thus facilitating the ability of a PVC producer to meet the new Government standards with respect to vinyl chloride. Further, with the reduction of polymer build-up, higher quality polymers are produced. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:
1. A polymerization reaction vessel having on all the internal surfaces thereof a coating comprised of a polyaromatic amine having the structure selected from the group consisting of

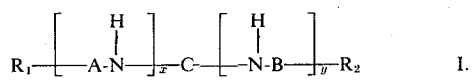   I.

wherein (1) A, B, and C are selected from the group consisting of

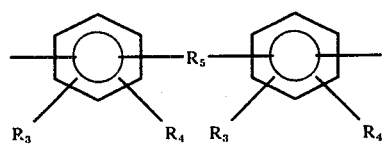   (a)

wherein $R_3$ and $R_4$ are either —H, —OH, —NH$_2$, halogen, or an alkyl group containing from 1 to 8 carbon atoms and may be the same or different; and $R_5$ is

or a straight chain or branched alkylene or alkylidene group containing from 1 to 5 carbon atoms; and

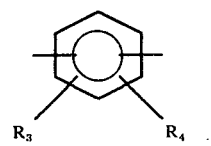   (b)

wherein $R_3$ and $R_4$ are the same as for (a); and wherein A, B and C may be the same or different and each repeating unit may be the same or different; $R_1$ and $R_2$ are either —H, —OH, —NH$_2$, or

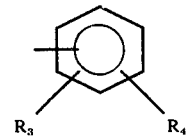

and may be the same or different and wherein $R_3$ and $R_4$ are the same as for (a); and (3) $x$ is an integer from 1 to 20 and $y$ is an integer from 0 to 20; and

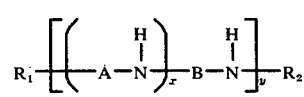   II.

wherein (4) A, B, $R_1$, $R_3$, $R_4$ and $R_5$ are the same as in I. and $R_2$ is —H, —OH, or

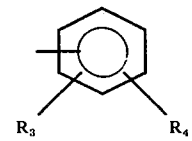

as defined in (2); and (5) $x$ is an integer from 1 to 4 and $y$ is an integer from 1 to 15, said polyaromatic amine being straight chained or branched and having a molecular weight greater than about 250.

2. A polymerization reaction vessel as defined in claim 1 wherein the polyaromatic amine has the structure (A).

3. A polymerization reaction vessel as defined in claim 1 wherein the polyaromatic amine has the structure (B).

4. A polymerization reaction vessel as defined in claim 1 wherein the polyaromatic amine is the reaction product of a polyamino benzene having the formula

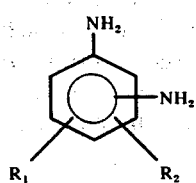

wherein $R_1$ and $R_2$ are either —H, —NH$_2$, —OH, halogen, or an alkyl group containing from 1 to 8 carbon atoms, and may be the same or different; and a polyhydric phenol having the formula

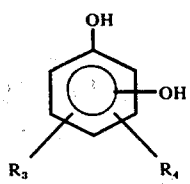

wherein $R_3$ and $R_4$ are either —H, —NH$_2$, —OH, halogen, or an alkyl group containing from 1 to 8 carbon atoms and may be the same or different.

5. A polymerization reaction vessel as defined in claim 1 wherein the polyaromatic amine is the reaction product of a polyamino benzene having the formula

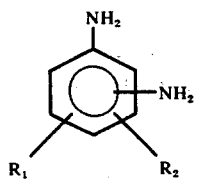

wherein $R_1$ and $R_2$ are either —H, —NH$_2$, —OH, halogen, or an alkyl group containing from 1 to 8 carbon atoms and may be the same or different; and a compound selected from the group consisting of diphenylamines, alkyl-substituted diphenylamines and other compounds all having the formula

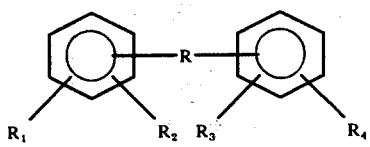

wherein R is

or a straight chain or branched alkyl group containing from 1 to 5 carbon atoms; and $R_1$, $R_2$, $R_3$ and $R_4$ may each be —H, —NH$_2$, —OH, halogen or an alkyl group containing from 1 to 8 carbon atoms and at least 2 of which are —NH$_2$ or —OH or one of each.

6. A polymerization reaction vessel as defined in claim 1 wherein the polyaromatic amine is the reaction product of a polyamino benzene having the formula

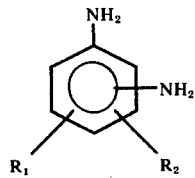

wherein $R_1$ and $R_2$ are either —H, —NH$_2$, —OH, halogen or an alkyl group containing from 1 to 8 carbon atoms and may be the same or different; and $R_2$ is —H, halogen or an alkyl group as defined for $R_1$, and an aminophenol or an alkyl-substituted aminophenol having the formula

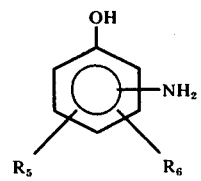

wherein $R_5$ and $R_6$ are either —H, —NH$_2$, —OH, halogen or an alkyl group containing from 1 to 8 carbon atoms and may be the same or different.

7. A polymerization reaction vessel as defined in claim 1 wherein the polyaromatic amine is the reaction product of an amino phenol having the formula

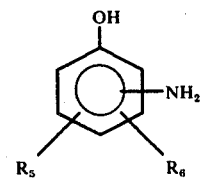

wherein $R_5$ and $R_6$ are either —H, —NH$_2$, —OH, halogen, or an alkyl group containing from 1 to 8 carbon atoms and may be the same or different; and a compound selected from the group consisting of diphenylamines, alkyl-substituted diphenylamines and other compounds all having the formula

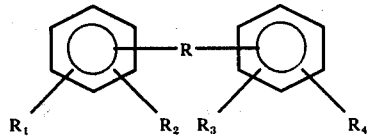

wherein R is

or a straight chain or branched alkyl group containing from 1 to 5 carbon atoms; and $R_1$, $R_2$, $R_3$ and $R_4$ may each be —H, —NH$_2$, —OH, halogen or an alkyl group containing from 1 to 8 carbon atoms and at least 2 of which are —NH$_2$ or —OH or one of each.

8. A polymerization reaction vessel as defined in claim 1 wherein the polyaromatic amine is the reaction product of a polyhydric phenol having the formula

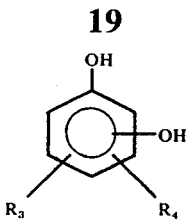

wherein R₃ and R₄ are either —H, —NH₂, —OH, halogen, or an alkyl group containing from 1 to 8 carbon atoms and may be the same or different; and a compound selected from the group consisting of diphenylamines, alkyl-substituted diphenylamines and other compounds all having the formula

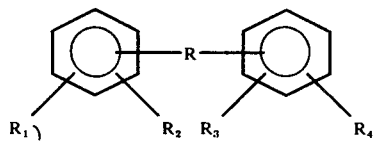

wherein R is

or a straight chain or branched alkyl group containing from 1 to 5 carbon atoms; and $R_1$, $R_2$, $R_3$ and $R_4$ may each be —H, —NH₂, —OH, halogen, or an alkyl group containing from 1 to 8 carbon atoms and at least 2 of which are —NH₂ or —OH or one of each.

9. A polymerization reaction vessel as defined in claim 1 wherein the polyaromatic amine has a molecular weight in the range of about 250 to 2000.

10. A polymerization reaction vessel as defined in claim 1 wherein the polyaromatic amine has a softening point in the range of from about 65° C. to about 175° C.

11. A polymerization reaction vessel as defined in claim 1 wherein the polyaromatic amine is a self-condensation product of any one of the compounds selected from the group consisting of polyamino benzenes, aminophenols, alkyl-substituted aminophenols; diphenylamines, and alkyl-substituted diphenylamines, and any of said compounds having a halogen atom attached thereto.

12. A polymerization reaction vessel as defined in claim 1 wherein the polyaromatic amine is the condensation reaction product of more than two of the compounds selected from the group consisting of polyamino benzenes, polyhydric phenols, aminophenols, alkyl-substituted aminophenols, diphenylamines, and alkyl-substituted diphenylamines, and any of said compounds having a halogen atom attached thereto.

13. A polymerization reaction vessel as defined in claim 1 wherein the polyaromatic amine is the reaction product of m-phenylenediamine and resorcinol.

14. A polymerization reaction vessel as defined in claim 1 wherein the polyaromatic amine is the reaction product of m-phenylenediamine and bisphenol A.

15. A polymerization reaction vessel as defined in claim 1 wherein the polyaromatic amine is the reaction product of o-phenylenediamine and resorcinol.

16. A polymerization reaction vessel as defined in claim 1 wherein the polyaromatic amine is self-condensed p-aminophenol.

17. A polymerization reaction vessel as defined in claim 1 wherein the polyaromatic amine is self-condensed p-phenylenediamine.

18. A process for substantially eliminating the buildup of polymers on all the exposed internal surfaces of a polymerization reaction vessel which comprises applying to all said internal surfaces a coating solution comprised of a straight chain or branched polyaromatic amine having a molecular weight greater than about 250 dissolved in an organic solvent therefor, said polyaromatic amine having the structure selected from the group consisting of

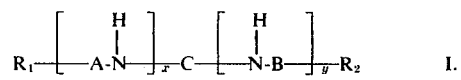

wherein (1) A, B, and C are selected from the group consisting of

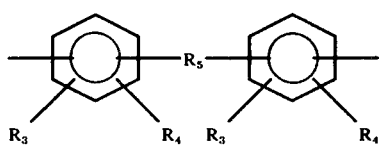

(a)

wherein R₃ and R₄ are either —H, —OH, —NH₂, halogen, or an alkyl group containing from 1 to 8 carbon atoms and may be the same or different; and R₅ is

or a straight chain or branched alkylene or alkylidene group containing from 1 to 5 carbon atoms; and (b)

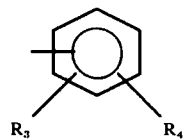

wherein R₃ and R₄ are the same as for (a); and wherein A, B and C may be the same or different and each repeating unit may be the same or different; R₁ and R₂ are either —H, —OH, —NH₂, or

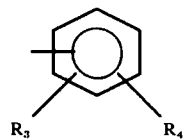

and may be the same or different and wherein R₃ and R₄ are the same as for (a); and (3) x is an integer from 1 to 20 and y is an integer from 0 to 20; and

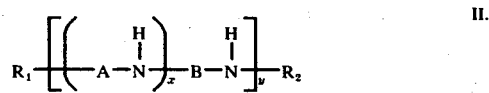

II.

wherein (4) A, B, R₁, R₃, R₄ and R₅ are the same as in I. and R₂ is —H, —OH, or

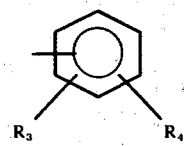

as defined in (2); and (5) x is an integer from 1 to 4 and y is an integer from 1 to 15.

19. A process as defined in claim 18 wherein the polyaromatic amine has the structure (A).

20. A process as defined in claim 18 wherein the polyaromatic amine has the structure (B).

21. A process as defined in claim 18 wherein the polyaromatic amine is the reaction product of a polyamino benzene having the formula

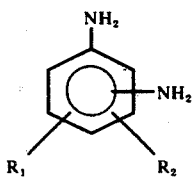

wherein $R_1$ and $R_2$ are either —H, —NH$_2$, —OH, halogen, or an alkyl group containing from 1 to 8 carbon atoms and may be the same or different; and a polyhydric phenol having the formula

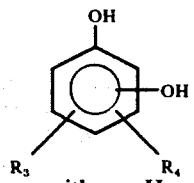

wherein $R_3$ and $R_4$ are either —H, —NH$_2$, —OH, halogen, or an alkyl group containing from 1 to 8 carbon atoms and may be the same or different.

22. A process as defined in claim 18 wherein the polyaromatic amine is the reaction product of a polyamino benzene having the formula

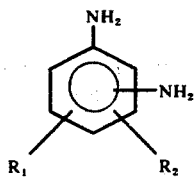

wherein $R_1$ and $R_2$ are either —H, —NH$_2$, —OH, halogen, or an alkyl group containing from 1 to 8 carbon atoms and may be the same or different; and a compound selected from the group consisting of diphenylamines, alkyl-substituted diphenylamines and other compounds all having the formula

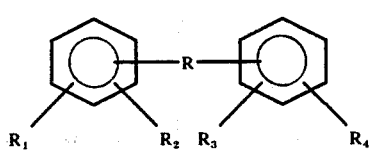

wherein R is

or a straight chain or branched alkyl group containing from 1 to 5 carbon atoms; and $R_1$, $R_2$, $R_3$ and $R_4$ may each be —H, —NH$_2$, —OH, halogen or an alkyl group containing from 1 to 8 carbon atoms and at least 2 of which are —NH$_2$ or —OH or one of each.

23. A process as defined in claim 18 wherein the polyaromatic amine is the reaction product of a polyamino benzene having the formula

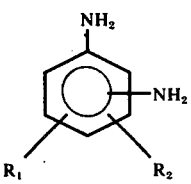

wherein $R_1$ and $R_2$ are either —H, —NH$_2$, —OH, halogen, or an alkyl group containing from 1 to 8 carbon atoms and may be the same or different; and an aminophenol or an alkyl-substituted aminophenol having the formula

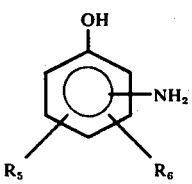

wherein $R_5$ and $R_6$ are either —H, —NH$_2$, —OH, halogen, or an alkyl group containing from 1 to 8 carbon atoms and may be the same or different.

24. A process as defined in claim 18 wherein the polyaromatic amine is the reaction product of an aminophenol or an alkyl-substituted aminophenol having the formula

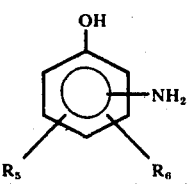

wherein $R_5$ and $R_6$ are either —H, —NH$_2$, —OH, halogen or an alkyl group containing from 1 to 8 carbon atoms and may be the same or different; and a compound selected from the group consisting of diphenylamines, alkyl-substituted diphenylamines and other compounds all having the formula

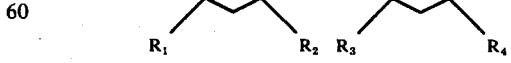

wherein R is

or a straight chain or branched alkyl group containing from 1 to 5 carbon atoms; and $R_1$, $R_2$, $R_3$ and $R_4$ may each be —H, —$NH_2$, —OH, halogen or an alkyl group containing from 1 to 8 carbon atoms and at least 2 of which are —$NH_2$ or —OH or one of each.

25. A process as defined in claim 18 wherein the polyaromatic amine is the reaction product of a polyhydric phenol having the formula

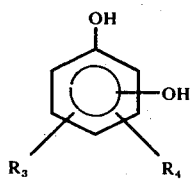

wherein $R_3$ and $R_4$ are either —H, —$NH_2$, —OH, halogen or an alkyl group containing from 1 to 8 carbon atoms and may be the same or different; and a compound selected from the group consisting of diphenylamines and alkyl-substituted diphenylamines and other compounds all having the formula

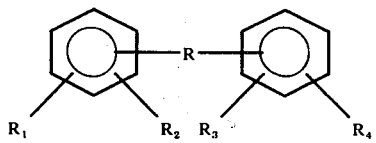

wherein R is

or a straight chain or branched alkyl group containing from 1 to 5 carbon atoms; and $R_1$, $R_2$, $R_3$ and $R_4$ may each be —H, —$NH_2$, —OH, halogen or an alkyl group containing from 1 to 8 carbon atoms and at least 2 of which are —$NH_2$ or —OH or one of each.

26. A process as defined in claim 18 wherein the coating solution contains from about 0.10% to about 10.0% by weight of the polyaromatic amine.

27. A process as defined in claim 18 wherein the organic solvent is dimethylformamide.

28. A process as defined in claim 18 wherein the organic solvent is the monoethyl ether of ethylene glycol.

29. A process as defined in claim 18 wherein the organic solvent is methyl alcohol.

30. A process as defined in claim 18 wherein the polyaromatic amine has a molecular weight in the range of about 250 to about 2000.

31. A process as defined in claim 18 wherein the polyaromatic amine is a self-condensation product of any one of the compounds selected from the group consisting of polyamino benzenes, aminophenols, alkyl-substituted aminophenols, diphenylamines, and alkyl-substituted diphenylamines, and any of said compounds having a halogen atom attached thereto.

32. A process as defined in claim 18 wherein the polyaromatic amine is the condensation reaction product of more than two of the compounds selected from the group consisting of polyamino benzenes, polyhydric phenols, aminophenols, alkyl-substituted aminophenols, diphenylamines, and alkyl-substituted diphenylamines, and any of said compounds having a halogen atom attached thereto.

33. A process as defined in claim 18 wherein the polyaromatic amine is the reaction product of m-phenylenediamine and resorcinol.

34. A process as defined in claim 18 wherein the polyaromatic amine is the reaction product of m-phenylenediamine and bisphenol A.

35. A process as defined in claim 18 wherein the polyaromatic amine is the reaction product of o-phenylenediamine and resorcinol.

36. A process as defined in claim 18 wherein the polyaromatic amine is self-condensed p-aminophenol.

37. A process as defined in claim 18 wherein the polyaromatic amine is self-condensed p-phenylenediamine.

38. In a process for the polymerization of olefinic monomers the improvement which comprises polymerizing the monomer or monomers in an aqueous polymerization medium and keeping said medium in constant contact throughout the polymerization reaction with a surface having thereon a water-insoluble coating comprised of a polyaromatic amine having the structure selected from the group consisting of

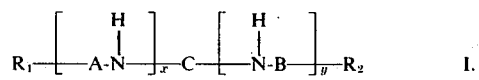   I.

wherein (1) A, B, and C are selected from the group consisting of

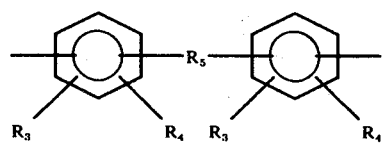   (a)

wherein $R_3$ and $R_4$ are either —H, —OH, —$NH_2$, halogen, or an alkyl group containing from 1 to 8 carbon atoms and may be the same or different; and $R_5$ is

or a straight chain or branched alkylene or alkylidene group containing from 1 to 5 carbon atoms; and

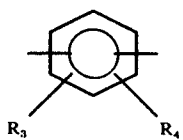   (b)

wherein $R_3$ and $R_4$ are the same as for (a); and wherein A, B and C may be the same or different and each repeating unit may be the same or different; $R_1$ and $R_2$ are either —H, —OH, —$NH_2$, or

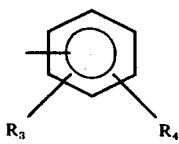

and may be the same or different and wherein $R_3$ and $R_4$ are the same as for (a); and (3) x is an integer from 1 to 20 and y is an integer from 0 to 20; and II. 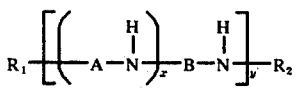

wherein (4) A, B, R$_1$, R$_3$, R$_4$ and R$_5$ are the same as in I. and R$_2$ is —H, —OH, or

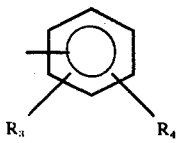

as defined in (2); and (5) $x$ is an integer from 1 to 4 and $y$ is an integer from 1 to 15, said polyaromatic amine being straight chained or branched and having a molecular weight greater than about 250, whereby due to said coating, polymer build-up on said surface is substantially eliminated.

39. A process as defined in claim 38 wherein the monomer is vinyl chloride.

40. A process as defined in claim 38 wherein the polymerization reaction is conducted at a temperature in the range of 0° C. to 100° C.

41. A process as defined in claim 38 wherein the polyaromatic amine is self-condensation product of any one of the compounds selected from the group consisting of polyamino benzenes, aminophenols, alkyl-substituted aminophenols, diphenylamines, and alkyl-substituted diphenylamines.

42. A process as defined in claim 38 wherein the polyaromatic amine is the condensation reaction product of more than two of the compounds selected from the group consisting of polyamino benzenes, polyhydric phenols, aminophenols, alkyl-substituted aminophenols, diphenylamines, and alkyl-substituted diphenylamines.

43. A process as defined in claim 38 wherein the polyaromatic amine is the reaction product of m-phenylenediamine and resorcinol.

44. A process as defined in claim 38 wherein the polyaromatic amine is the reaction product of m-phenylenediamine and bisphenol A.

45. A process as defined in claim 38 wherein the polyaromatic amine is the reaction product of o-phenylenediamine and resorcinol.

46. A process as defined in claim 38 wherein the polyaromatic amine is self-condensed p-aminophenol.

47. A process as defined in claim 38 wherein the polyaromatic amine is self-condensed m-phenylenediamine.

48. A process as defined in claim 43 wherein the monomer is vinyl chloride.

49. A process as defined in claim 48 wherein the temperature of polymerization is in the range of about 40° C. to about 70° C.

* * * * *